United States Patent

[11] 3,612,599

| [72] | Inventor | Ernest Robert Sternberg<br>Rocky River, Ohio |
|---|---|---|
| [21] | Appl. No. | 842,145 |
| [22] | Filed | July 16, 1969 |
| [45] | Patented | Oct. 12, 1971 |
| [73] | Assignee | White Motor Corporation<br>Cleveland, Ohio |

[54] OVER-THE-HIGHWAY TRUCK CAB
16 Claims, 4 Drawing Figs.

[52] U.S. Cl. .................................................. 296/24,
296/28.21, 5/118
[51] Int. Cl. ....................................................... B62d 25/00
[50] Field of Search ............................................ 296/24,
28.21, 66; 5/118

[56] References Cited
UNITED STATES PATENTS
3,141,178  7/1964  Campbell ........................ 5/118
3,231,304  1/1966  Coup ................................ 296/24

FOREIGN PATENTS
939,553  2/1956  Germany ..................... 296/28.21

Primary Examiner—Philip Goodman
Attorney—Watts, Hoffmann, Fisher & Heinke

ABSTRACT: A cab for a highway truck or tractor is disclosed in which a sleeping compartment including a sleeper bunk assembly is located between a ceiling of the driver's compartment and the roof of the cab.

A bunk assembly for highway vehicles is disclosed including frame members connected to the vehicle by resilient support structures for enabling relative movement of the bunk vertically with respect to the vehicle and thereby dampening vertical shock loads. A mattress-supporting pallet extends between the frame members and second support structures are located between the pallet and the frame. These support structures enable motion of the pallet in forward and rearward directions in the vehicle so that shock loads from pitching are minimized.

PATENTED OCT 12 1971 3,612,599

INVENTOR.
ERNEST R. STERNBERG
BY Watts, Hoffmann,
Fisher & Heinke
ATTORNEYS.

3,612,599

OVER-THE-HIGHWAY TRUCK CAB

BACKGROUND OF THE INVENTION

1. Field of the Invention

The present invention relates to over-the-highway vehicles and more particularly relates to highway truck and tractor cabs equipped with sleeper bunks.

2. The Prior Art

Cabs equipped with sleeper bunks have normally been constructed with a sleeping compartment located in the cab to the rear of the driver's seat. In such constructions, the sleeper bunk assembly is generally located a substantial vertical distance from the wheels of the vehicle.

Prior art sleeper bunk constructions have generally been provided with springs to cushion vertical shock loads which might otherwise be applied directly to the sleeper bunk. In many instances these prior art proposals have been quite complicated and therefore expensive. Furthermore, at least some of the previously proposed constructions are subject to being damaged in response to sharp upward movement of the bunk relative to the cab.

Because of the relatively large vertical distance between the location of sleeper bunks and the wheels of the vehicle, pitching of the cab i.e., the tendency of the cab to rotate about some axis which extends generally parallel to the axles of the vehicle, is quite pronounced at the level of the sleeper bunk. It should be noted that while the cab instantaneously pitches about a given pitch axis the irregularities encountered on road surfaces, etc. cause the location of the pitch axis itself to shift abruptly and this action subjects the bunk to shock loadings. The pitching motion of the cab imparts shock loads to the sleeper bunk and these loads are directed in a forward or rearward direction relative to the cab. These shock loads have resulted in discomfort to individuals attempting to sleep on the bunk particularly when the vehicle is moving along a relatively rough pavement.

The previously proposed sleeper bunk constructions have made little, if any, provision for pitching shock loads transmitted to the bunk from the truck cab. Many of the prior art constructions have been specifically constructed so as to constrain the bunk against forward or rearward motion relative to the cab.

The size of over-the-highway vehicles is limited by both safety and legal considerations. Height, width, overall length and axle loadings are all controlled by law. Since the overall length is controlled by law, the longer a highway tractor cab is the shorter the trailer or trailers which can be legally hauled by that tractor. Shortening the permissible length of the trailer obviously reduces the volume available for carrying cargo and therefore reduces the maximum possible payload.

Conventionally, the sleeper bunks have been positioned behind the driver. This means that prior art highway tractor cabs equipped with sleeper bunks have been longer than corresponding vehicles not equipped with sleepers. The adverse consequences of such increased length have been magnified in recent years through the growing trend permitting multiple trailer "rigs" on highways. Where a pair of trailers are hauled by a single tractor, maximum axle loadings are less apt to be a determining criterion on the size of a trailer but rather the overall length of the vehicles becomes a principal consideration in determining trailer size. Accordingly, the size trailer which can be hauled by a sleeper has been limited as compared with other highway tractors.

SUMMARY OF THE INVENTION

The present invention provides an over-the-highway vehicle cab including a sleeper bunk assembly capable of cushioning vertical shock loads applied to the bunk and isolating vibrational forces. This new bunk is constructed and arranged so that shock loads due to pitching of the truck cab are cushioned. resulting in an extremely comfortable sleeper bunk.

The invention further provides a vehicle cab having a sleeper bunk of the type referred to wherein the sleeper bunk is located in the cab above the driver. This reduces the length of the cab to enable greater trailer or truck body lengths and payloads.

A sleeper bunk constructed according to the present invention may be disposed in any suitable location in the cab and includes a pair of spaced-apart parallel frames connected to a supporting shelf or surface in the cab. The frames are connected to the cab by a support structure which enables vertical movement of the frames relative to the cab. The support structure includes springs which resiliently urge the frames to a predetermined position relative to the cab and yet which are capable of yielding resiliently in response to shock loads applied in a vertical direction from the supporting shelf of the frame. Thus the frame is cushioned against such shock loadings. Resilient mountings are included in the support construction to cushion the frames against vertical upward movement relative to the shelf which might otherwise result in damage to the structure.

In a preferred construction, a rectangular mattress-supporting pallet is disposed over the frames with one frame at each end of the pallet. The pallet and frames are connected together by a second support structure which enables movement of the pallet forwardly and rearwardly of the cab relative to the frames. The mattress and/or pallet may be other than rectangular. For example, they may have tapered or curved sides depending on the cab construction.

The second structure includes rollers fixed to the ends of the pallet and engaging horizontal bearing surfaces on the frames. The rollers are capable of moving horizontally along the frame members through a given range of movement. Since the pallet is carried by the rollers, the pallet likewise can move horizontally relative to the frames forwardly and rearwardly of the cab.

In a preferred construction, two rollers are mounted at each end of the pallet and each roller is acted upon by a spring-biased member so that the rollers are urged toward a centered position on the frame. The spring-biased members act in opposition to each other. Thus movement of the rollers relative to the frame in one direction is resisted by one spring-biased member while movement from the centered position in the opposite direction is resisted by the second spring-biased member. In this manner, the pallet is capable of movement forwardly and rearwardly of the cab relative to its supporting frames, yet the movement is resisted and dampened by the spring-biased members. Hence, pitching shock loads which would otherwise be applied to the pallet are cushioned.

A sleeper bunk construction of the general type referred to is particularly advantageous where the sleeper bunk is located above the driver since in this location the vertical distance between bunk and the ground-engaging wheels of the vehicle is maximum. Pitching motion of the cab is therefore quite pronounced at the level of the bunk. The new sleeper bunk structure is instrumental in reducing shock loads applied to a sleeper bunk at this maximum elevation.

A principal object of the present invention therefore is the provision of a new and improved vehicle sleeper bunk assembly in which a mattress and mattress-supporting structure are cushioned against vertically directed shock loads as well as against shock loads oriented in a direction forwardly or rearwardly of the vehicle caused by pitching of the vehicle.

Another object of the present invention is the provision of a new and improved truck cab wherein a sleeper bunk is supported in the cab vertically above the driver's seat to substantially shorten the length of the cab and enable greater payloads and trailer lengths within the maximum permissible overall length.

Other objects and advantages of the present invention will become apparent from a consideration of the following detailed description thereof made with reference to the accompanying drawings which form a part of the specification.

DESCRIPTION OF THE PREFERRED EMBODIMENT

Figure 1A:
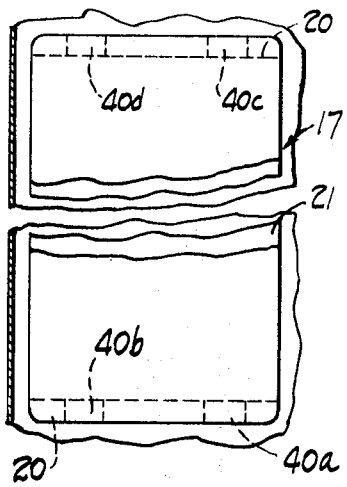
FIG. 1A is a plan view seen from the plane indicated by the line 1A—1A of FIG. 1.
Figure 1:
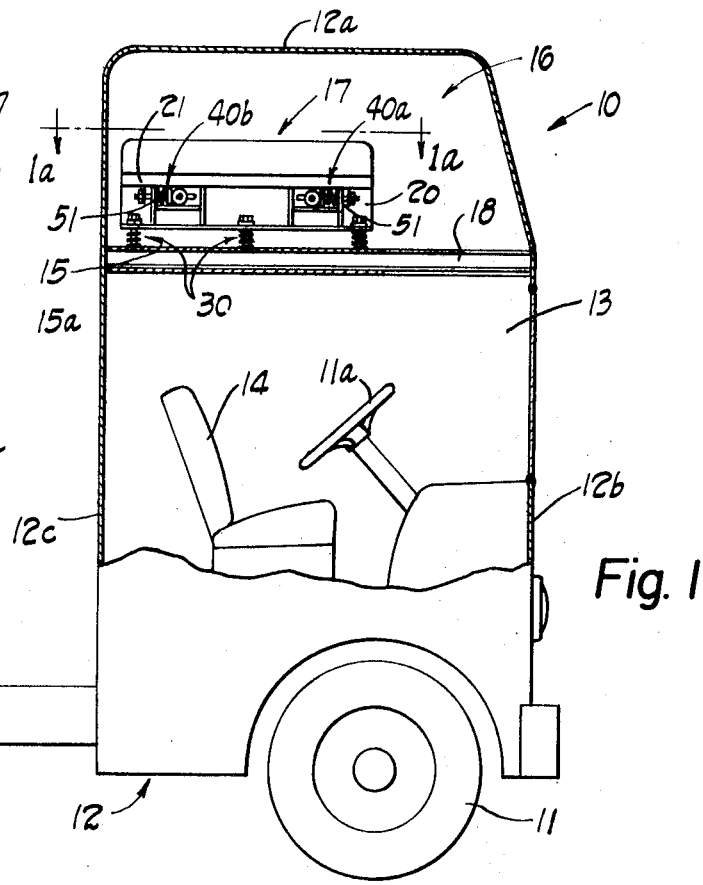
FIG. 1 is a schematic cross-sectional view of a truck cab embodying the present invention.

A highway tractor 10 embodying the present invention is illustrated in FIG. 1. The tractor 10 shown is of the cab-over-engine type. The tractor includes steerable ground engaging wheels 11 controlled by steering wheel 11a. A cab 12, defined by a roof 12a, and front and backwalls 12b, 12c, is supported on a chassis including a frame F. The chassis is in turn supported by the wheels 11. A driver's compartment, generally designated 13, is defined by the cab 12.

The driver's compartment 13 includes a conventional driver's seat 14 which extends transversely of the cab. The ceiling of the driver's compartment is formed by a rigid support shelf 15 and suitable panel 15a extending across the driver's compartment. The support shelf 15 and the roof 12a of the cab 12 are spaced apart to define a sleeping compartment generally indicated at 16. The compartment 16 includes a sleeper bunk assembly 17 and is entered from the driver's compartment through a suitable access opening 18.

The sleeper bunk assembly 17 includes spaced parallel end frames 20 (FIG. 1A) and a rectangular mattress-supporting pallet 21 supported by the frames. The pallet 21 may be of any suitable construction and is therefore not described in detail. The ends of the pallet 21 are disposed over the end frames 20. Angle irons 22 (FIGS. 2 and 3) are connected to the ends of the pallet and each angle iron includes a downwardly extending flange 23 connected to the adjacent end frame 20 as is described in detail presently.

Figure 2:
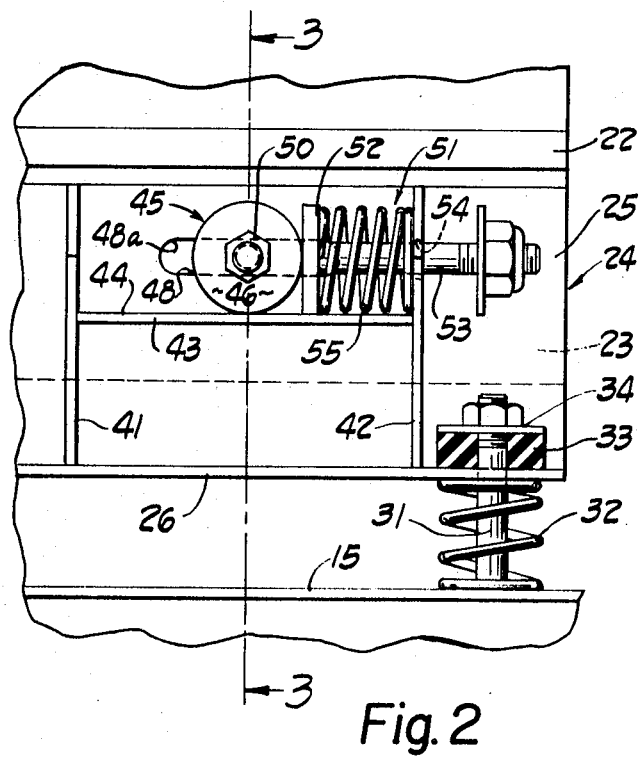
FIG. 2 is an enlarged fragmentary view of a portion of the truck cab illustrated in FIG. 1; and, FIG. 3 is a cross-sectional view as seen from the plane indicated from the line 3—3 of FIG. 2.
Figure 3:
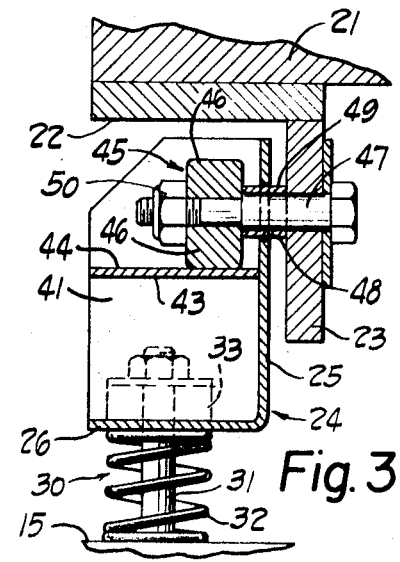

Referring now to FIGS. 2 and 3, the end frames 20 are each defined by a beam member 24 having a generally L-shaped cross section. The beam member includes a vertically extending flange 25 and a horizontal flange 26. The horizontal flange 26 is at the lowermost side of the beam member 24 while the vertical flange 25 extends parallel to and adjacent the associated flange 23 of an angle iron 22.

The end frames 20 are capable of vertical movement relative to the support shelf 15 and each frame is supported for such movement by a support structure 30. Each frame and its support structure 30 are identical and therefore only one is described in detail.

The support structure 30 resiliently resists relative movement between the end frame and the supporting shelf to cushion vertical vibrations and shock loadings. The support structure 30 includes three studs 31 which are fixed to the support shelf and extend upwardly through openings in the horizontal flange 26. A helical compression spring 32 surrounds each stud 31 and is compressed between the support shelf 15 and the downwardly facing surface of the horizontal flange 26.

The upper end of each stud is threaded and a toroidal rubber member 33 is disposed about the end of the stud in engagement with an upwardly facing surface of the flange 26. The rubber member 33 bears against flange 26 when in the position illustrated, and is maintained in position by a locknut and washer assembly 34 threaded on the end of the stud 31.

When an occupant of the vehicle is resting on the sleeper bunk assembly, it is apparent that the compression spring 32 surrounding each of the studs 31 is partially compressed. When the tractor encounters a rough road surface, vertically directed shock forces are transmitted from the wheels 11 to the body and support shelf 15 and tend to be transmitted to the mattress supporting pallet through the support structure 30 and end frames 20. However, the springs 32 are resiliently compressed by these forces and the mattress-supporting pallet therefore tends to remain stationary relative to the cab 10. The vertically directed shock forces are thus cushioned by the support structure 30.

Should the supporting shelf 15 suddenly move downwardly with respect to the mattress-supporting pallet 21, the compressive force on the springs 32 is suddenly relieved and the rubber members 33 engage the upper surface of the flanges 26. This action is termed "bounce back" and the members 33 cushion bounce back shocks which might otherwise be transmitted to the pallet 21 through the frames 20. The presence of the rubber members 33 also avoids possible damage to the end frames which might otherwise occur in such circumstances.

It should be also noted that the frames are independently supported in the cab and thus the support structure 30 for each frame is capable of reacting to the shock loading applied to that support regardless of the load which might be simultaneously applied to the other frame and its support structure 30. Further, the support structures 30 can be resiliently cocked relative to a horizontal plane due to the independent operation of the elements of each support structure 30.

It is apparent from FIG. 1 that the sleeper bunk assembly 17 is located substantially above the ground-engaging wheels 11 of the vehicle. Accordingly, pitching motion of the cab is quite pronounced at the level of the sleeper bunk. The sleeper bunk assembly 17 is provided with four support structures 40 a –d, two of which are located at each end of the mattress-supporting pallet 21. Each of the support structures supports a portion of a pallet load on an associated end frame. Since each of the support structures is identical, only one, 40a, is described in detail and in its relation to the other support structure, 40b, at the same end of the pallet.

The support structure 40a includes vertical plates 41, 42 which are fixed in the end frame 20 at spaced locations. A horizontal plate 43 extends between the plates 41, 42 at a location spaced vertically above the horizontal flange 26. The plate 43 defines an upwardly facing bearing surface 44.

A bearing assembly 45 is carried by the angle iron 22 for engagement with and movement along the bearing surface 44 while supporting the pallet 21. The bearing assembly 45 includes a roller member 46 rotatably supported on a shaft 47 formed by a bolt which extends through the angle iron flange 23, a slot 48 in the vertical flange 25 of the end frame 20 and the roller 46. The end of the shaft 47 is threaded for reception of a suitable nut 50 for maintaining the bearing member 46 in position on the shaft. A sleeve 49 surrounds the shaft between the roller 46 and the angle iron 22 for maintaining the shaft fixed against motion along its axis.

The bearing member 46 is engaged by a biasing structure 51 which urges the bearing member and its shaft 47 towards one end 48a of the slot 48. The biasing structure 51 includes a plate 52 engaging the roller 46 and a bolt 53 secured to the plate 52 and extending through an opening 54 in the vertical plate 42. A compression spring 55 surrounds the shank of the bolt 53 between the plates 42 and 52. The spring 55 is preferably a helical spring and acts between the plates 42, 52 to urge the roller 46 to the left as viewed in FIG. 2.

Referring again to FIG. 1, it can be seen that the support structures 40a, 40b at the noted end of the pallet 21 include identical biasing structures 51 which act in opposition to each other. Thus the rollers 46 of each bearing assembly 45 are normally urged to a centered location in each slot 48. When pitching of the cab occurs, the pallet 21, mattress and an individual on the mattress tend to be maintained in a stationary location relative to the shelf 15 due to inertia. Hence, the momentum of the pallet 21, the mattress, and the person reclining on the mattress tends to compress one of the springs 55 enabling the pallet, mattress and sleeper to remain substantially stationary with respect to the relatively moving shelf 15. The spring 55 resists the relative movement between the supporting shelf 15 and the bunk and hence cushions the pitching shock forces which might otherwise be transmitted to the pallet, mattress and sleeping individual. Because of this construction therefore, the sleeper bunk assembly 17 is extremely comfortable even though located considerably above the wheels of the tractor.

While a sleeper bunk assembly embodying the present invention has been illustrated and described herein as being located above the driver's seat, it is apparent that the advantages of the present sleeper bunk construction can readily be realized when the bunk is located in a conventional position, i.e., on a supporting shelf behind the driver's seat.

Although a preferred embodiment of the invention has been described with a certain degree of particularity, it is understood that the present disclosure of this preferred form has been made only by way of example and that numerous changes in details of construction and arrangement of parts may be resorted to without departing from the scope of the invention.

What is claimed is:

1. In a highway vehicle, a cab comprising:
   a. a driver's compartment having a seat therein;
   b. a shelf structure above said seat defining at least a part of a ceiling of said compartment and spaced from the roof of said cab;
   c. a bunk assembly supported on said shelf structure and accessible from said compartment; and,
   d. said bunk assembly including a bunk and bunk-supporting structure for resiliently resisting relative motion between said bunk and said shelf structure in a direction forwardly or rearwardly relative to said cab to cushion forces acting between said bunk assembly and said shelf in said direction.

2. A cab as claimed in claim 1 wherein said bunk-supporting structure includes at least a biasing structure acting to urge said bunk horizontally to a predetermined position relative to said shelf and resiliently enabling horizontal motion of said bunk relative to said cab from said predetermined position.

3. A cab as claimed in claim 2 and further including a second support structure for cushioning vertical forces applied to said bunk.

4. In a highway vehicle cab, a sleeper bunk structure comprising:
   a. a supporting shelf structure in said cab;
   b. a sleeper bunk assembly supported on said shelf, said assembly comprising;
   c. at least two support frame members connected to said shelf;
   d. a mattress support member extending across said frame members;
   e. a support means between said mattress support member and said frame members including at least one roller rotatably carried by one of said members and a horizontal bearing surface for said at least one roller on another of said members, said roller and bearing surface horizontally movable relative to each other when said shelf structure moves relative to said mattress support member horizontally along the line of the direction of travel of said cab; and,
   f. motion retarding means for resiliently opposing relative movement between said roller and said bearing surface.

5. In a cab as claimed in claim 4 wherein said motion-retarding means comprising a biasing structure acting on said roller for normally urging said roller to a predetermined location on said bearing surface.

6. In a cab as claimed in claim 4 wherein said support frames are disposed horizontally and parallel to each other with longitudinal axes extending parallel to the direction of travel of said cab, said support frames each defining two bearing surfaces, each supporting a roller carried by said mattress support member.

7. In a cab as claimed in claim 6 wherein said motion-retarding means comprises a biasing structure associated with each roller, said biasing structure acting in opposition to each other to resiliently maintain said mattress support structure in a predetermined position relative to said cab.

8. In a cab as claimed in claim 7 wherein said biasing structure comprises a force-applying member engaging said roller and a spring acting between said force-applying member and a frame member, said force-applying member supported for movement relative to said frame.

9. In a cab as claimed in claim 4 wherein each of said frames is resiliently maintained in position vertically relative to said cab by a second support structure effective to cushion vertical shock loadings.

10. A cab as claimed in claim 9 wherein said second support structure comprises a vertical member extending through an opening in a frame, a compression spring disposed about said vertical member between said frame and said shelf structure and a resiliently copressable member between a projecting end of said member and said frame.

11. In a cab as claimed in claim 4 wherein said supporting shelf structure is disposed vertically above a driver of said cab and said bunk assembly is located between a roof of said cab and said shelf.

12. In a vehicle including a cab having a roof, and front and backwalls, a steering wheel and a seat within the cab and positioned such that an occupant thereof is in position to manipulate the steering wheel, the combination of:
   a. a shelf attached to said cab and extending over such occupant position transversely of said cab;
   b. said shelf being spaced from said cab roof;
   c. a bunk mounted on said shelf; and,
   d. said shelf defining an opening adjacent one of said walls to provide access to said bunk, said opening located above and offset from said position.

13. In a vehicle as claimed in claim 12 wherein said bunk includes structure for cushioning horizontal shock forces acting between said shelf and said bunk during pitching of said cab.

14. A vehicle bunk comprising:
   a. at least one frame member;
   b. a mattress-supporting member;
   c. supporting means between said at least one frame member and said mattress-supporting member for constraining said mattress-supporting member for horizontal movement relative to said at least one frame member;
   d. said supporting means including spring structure resiliently resisting said relative movement and urging said mattress support toward a predetermined position relative to said at least one frame member whereby horizontal pitching forces transmitted between said frame member and said mattress-supporting member are cushioned.

15. A bunk as claimed in claim 14 wherein said supporting means includes a plurality of bearings between said frame and said mattress-supporting member enabling said horizontal relative movement.

16. A bunk as claimed in claim 15 wherein said supporting means further includes structure connecting said at least one frame member to said mattress-supporting member for preventing relative movement between said mattress-supporting member and said frame in a vertical direction, and shock absorber means for supporting said at least one frame member and said mattress-supporting member while isolating said members from vertical shock forces.